Sept. 8, 1959   I. C. McKECHNIE   2,903,556
HIGH FREQUENCY VIBRATION
Original Filed May 17, 1955
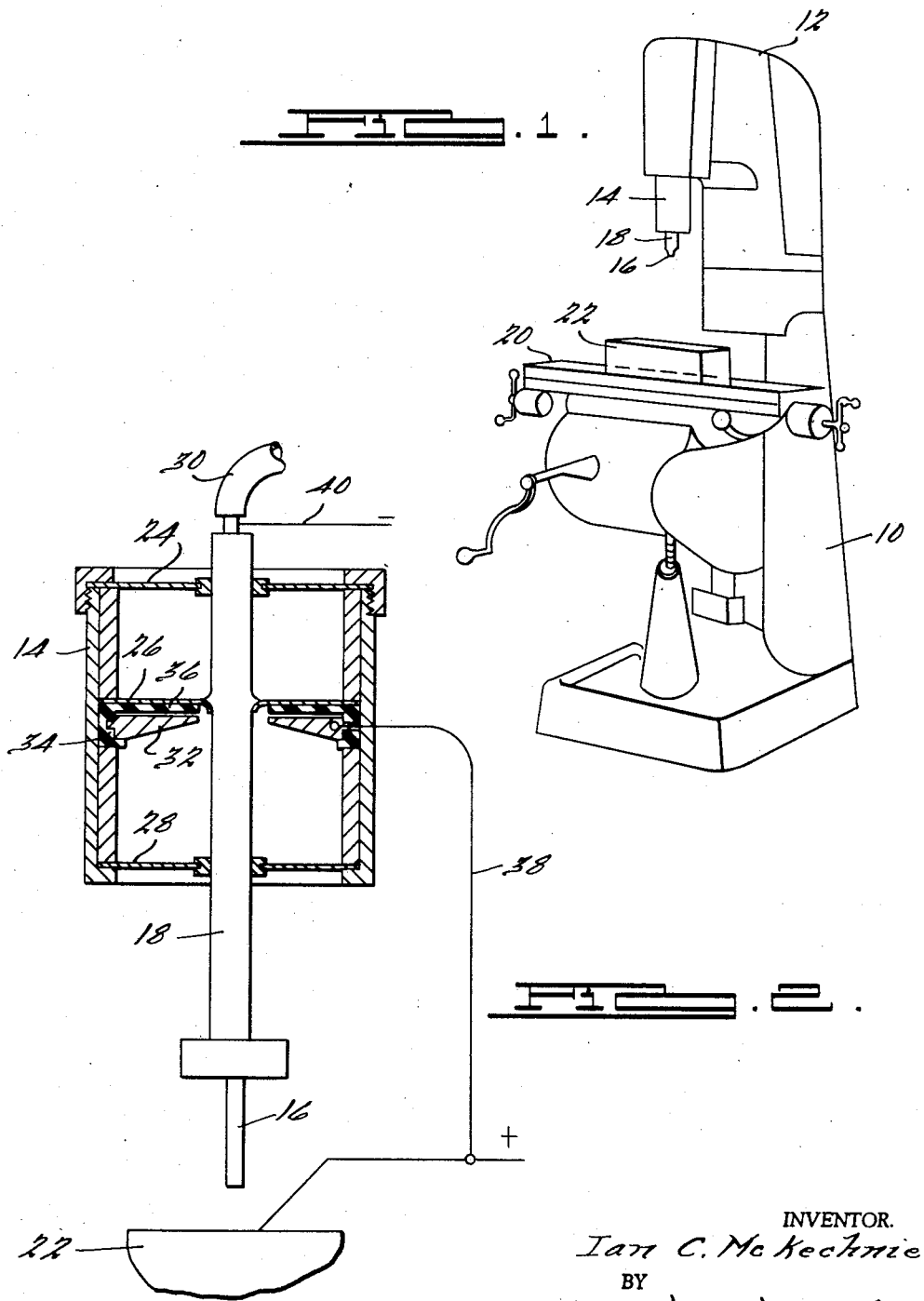
INVENTOR.
Ian C. McKechnie.
BY
M K Murphy
ATTORNEY.

United States Patent Office 2,903,556
Patented Sept. 8, 1959

2,903,556

HIGH FREQUENCY VIBRATION

Ian C. McKechnie, Pontiac, Mich., assignor to Elox Corporation of Michigan, Clawson, Mich.

Original application May 17, 1955, Serial No. 508,932. Divided and this application November 13, 1957, Serial No. 696,260

7 Claims. (Cl. 219—69)

This invention relates to improvements in the art of arc-machining, or as it is sometimes referred to, spark-machining, metal-disintegration or electrical-discharge-machining, and this application is a division of my copending application Serial No. 508,932, filed May 17, 1955.

During early stages in the development of the art, the machining electrode was reciprocated or vibrated. There were a number of reasons for this, among them, to aid in positioning the electrode relatively to the work surface (i.e. to provide a "feel" when feeding the electrode manually) and to aid in extinguishing the arc thereby to provide the desirable intermittent discharge. This deliberate reciprocatory motion of the electrode was in the order of seven or eight thousandths of an inch—sometimes greater—and resulted in relatively sloppy overall positioning of the electrode during the machining operation so that the dimensional accuracy of the machined cavity could not be held to close tolerances.

With the development of automatic electrode feed mechanisms and of power supplies which eliminated the necessity of vibrating the electrode to extinguish the arc, it was found that superior results could be obtained without electrode reciprocation. At the present time, practically all modern arc-machining apparatus is provided with an automatic electrode feed device which positions the electrode in predetermined space-gap relationship with the workpiece surface and advances and retracts the electrode as the workpiece is eroded or eroded particles lodge in the gap. Coolant fluid, preferably dielectric fluid, is usually circulated through the gap and the fluid circulation tends to keep the gap clear of chips. However, under some conditions "stringers" of eroded material tend to bridge the gap. This condition is especially troublesome when fine work is being done with very small gaps. These stringers form a high resistance short-circuit across the gap and cutting ceases until the automatic power feed responds to the short and pulls the electrode away from the work and breaks the stringers. All this slows up the machining operation and is objectionable in that prolonged shorting across the gap causes heating of the workpiece and impairs surface finish.

I have found that vibration of the electrode at very high relative frequency and very low amplitude will effectively prevent formation of stringers or will break them instantly upon formation, thereupon improving the arc-machining operation from the standpoint of speed and finish. I am now speaking of electrode vibration above 15,000 cycles at amplitude of approximately .000001 inch, but preferably in the order of 15,000 to 35,000 cycles at amplitudes in the order of from .001 to .000001 inch.

I have found that vibration of such amplitudes does not affect the dimensional accuracy of the hole being cut while vibration at such frequencies aids flow of coolant in the cutting zone and causes breaking of stringers and dislodgment of accumulated chips along the sides of the hole.

There are various methods of obtaining electrode vibration of the character just mentioned. Reference is made to the accompanying drawing in which I have shown a preferred embodiment.

In the drawing in which reference characters are used to designate like parts referred to below, Fig. 1 is a perspective view of an electrical-discharge machine tool, and Fig. 2 is an enlarged sectional view of the machining head.

Referring to Fig. 1, it will be seen that the machine tool comprises a base structure 10 having an upright portion 12 which carries an adjustable machining head 14. The head 14 carries an electrode 16 in a suitable holder 18. The entire head is adapted to be fed toward and away from a workpiece by means of an automatic servofeed device of the type shown in McKechnie Patent No. 2,501,954, or equivalent. The machine has a table 20 on which is supported a pan 22 in which a workpiece may be rigidly supported. Coolant may be supplied and exhausted from the pan 22 by pipes or tubes (not shown), or the coolant may be pumped through the electrode as is common in the art. The electrode 16 is preferably suitably connected to the negative side of a D.C. power supply, and the workpiece is connected to the positive side of the supply. A.C. current may be used under proper conditions as is known in the art.

Referring now to Fig. 2, it may be seen that the machining head 14 consists of a transducer for converting electrical energy into mechanical energy for vibrating the electrode tool 16. The transducer comprises a casing in which the electrode holder 18 is supported by flexible diaphragms 24, 26, 28. The electrode is preferably hollow and is supplied with coolant through a passage in the holder 18 and a supply tube 30.

Mounted below the diaphragm 26 is a condenser plate 32. This plate is mounted in an insulating member 34 which has an annular portion 36 underlying the diaphragm 26. The portion 36 is substantially coaxial with the plate 32 and is made of some insulating material such as rubber or plastic such that it has some flexibility and will permit flexing of the diaphragm and vibration of the member 18.

The diaphragm 26 is electrically bonded to the holder 18 and is therefore biased electronegative, the tool and holder being connected to the negative wire 40 of the power supply. The plate 32 is connected by wire 38 with the positive side of the power supply and is therefore electropositive. It will thus be seen that the diaphragm 26 and the plate 32, together with the insulator 36, constitute an electrical condenser, and that establishment of a potential difference across the gap between the electrode 16 and a conductive workpiece placed in the pan 22 will charge the condenser thereby causing attraction between the condenser plates. This attraction will cause downward movement of the diaphragm 26 (because of the relatively greater rigidity of the plate 32) and the electrode 16 will be thus moved toward the workpiece a slight distance.

Discharge across the gap between the electrode and work will discharge the condenser whereupon the diaphragm 26 and plate 32 will tend to move apart, drawing the electrode away from the work. This action is repeated each time the condenser is charged and discharged, and the tool 16 will therefore reciprocate at the frequency of the power supply.

By adjusting the size and construction of the condenser, the amplitude of the electrode motion may be controlled so that dimensional accuracy of the machined surface will not be impaired.

It will be understood that by use of the arrangement described, the operation and efficiency of an arc-machining process will be vastly improved because of the virtual elimination of "stringers" and "treeing" and lodgment of chips in the machining zone. High frequency reciprocation of the electrode also causes pumping of the coolant in the hole and this further improves dislodgment of the chips.

While I have shown but a single embodiment of the invention for illustrative purposes, it will be understood that I do not thereby intend to limit the application or practice of the invention except as set forth in the appended claims.

I claim:

1. In an arc-machining apparatus having an electrode and means for causing an electrical discharge across a gap between the electrode and a workpiece, means mounting said electrode for high-frequency vibration at small amplitude comprising a vibratory support, a flexible diaphragm mounting said support and forming one plate of a condenser, a second condenser plate disposed adjacent and in operative relation with said first condenser plate, means connecting said condenser across said gap, and means for charging said condenser with an A.C. voltage of sufficient magnitude to fire said gap.

2. The combination of claim 1 wherein said A.C. voltage has a frequency between 15,000 and 35,000 cycles.

3. In an arc-machining apparatus having an electrode and means for causing an electrical discharge across a gap between the electrode and a workpiece, means mounting said electrode for high-frequency vibration at small amplitude comprising a vibratory support, a flexible diaphragm mounting said support and forming one plate of a condenser, a second condenser plate disposed in operative relation with said first condenser plate, means for establishing an intermittent voltage across said gap and circuit means connecting said condenser across said gap whereby firing of said gap will cause vibration of said electrode.

4. In an electrical-discharge-machining apparatus having an electrode mounted in spaced relationship with an electrically conductive workpiece and a power supply adapted to deliver power pulses to the gap between the electrode and workpiece, means for mounting said electrode comprising a metallic diaphragm carrying said electrode and a metal plate mounted in spaced relationship therewith such that the diaphragm and plate form an electrical condenser, and means connecting said condenser across said gap whereby said condenser is charged by power pulses from said power supply and is discharged upon firing of the gap.

5. The combination of claim 4 wherein said condenser elements are constructed and arranged such that attraction of said elements in response to condenser charging moves the electrode toward the workpiece.

6. The combination of claim 4 wherein said diaphragm and said metal plate are mounted in vertically spaced relation.

7. The combination of claim 4 wherein said diaphragm and said metal plate are mounted in vertically spaced relation with a layer of dielectric material interposed loosely therebetween.

References Cited in the file of this patent

UNITED STATES PATENTS

| | | |
|---|---|---|
| 2,654,256 | McKechnie | Oct. 6, 1953 |
| 2,766,364 | Higgins et al. | Oct. 9, 1956 |
| 2,796,509 | Blake | June 18, 1957 |